US012729743B1

(12) United States Patent
Antoni et al.

(10) Patent No.: US 12,729,743 B1
(45) Date of Patent: Sep. 8, 2026

(54) REDUCTION OF GEOMETRIC STRESS CONCENTRATION OF LANDING GEAR SHOCK ABSORBER BEARING SEAL GROOVES

(71) Applicants: Safran Landing Systems, Velizy-Villacoublay (FR); Safran Landing Systems Canada Inc., Ajax (CA)

(72) Inventors: Nicolas Antoni, Velizy-Villacoublay (FR); Randy Lee, Ajax (CA); Zoran Pasic, Ajax (CA)

(73) Assignees: Safran Landing Systems, Velizy-Villacoublay (FR); Safran Landing Systems Canada Inc., Ajax (CA)

( * ) Notice: Subject to any disclaimer, the term of this patent is extended or adjusted under 35 U.S.C. 154(b) by 0 days.

(21) Appl. No.: 19/366,315

(22) Filed: Oct. 22, 2025

(51) Int. Cl.
*F16F 9/36* (2006.01)
*B64C 25/60* (2006.01)

(52) U.S. Cl.
CPC .............. *F16F 9/366* (2013.01); *B64C 25/60* (2013.01)

(58) Field of Classification Search
CPC . F16F 9/366; F16F 9/362; F16F 9/361; F15B 15/222; B64C 25/60
See application file for complete search history.

(56) References Cited

U.S. PATENT DOCUMENTS

| | | | | |
|---|---|---|---|---|
| 2,159,058 A * | 5/1939 | Taylor | B64C 35/008 244/101 |
| 5,396,973 A * | 3/1995 | Schwemmer | F16F 9/38 188/266.2 |
| 6,019,201 A * | 2/2000 | Gordaninejad | F16F 9/535 267/140.14 |
| 6,694,856 B1 * | 2/2004 | Chen | F16F 13/007 89/43.01 |
| 8,886,402 B1 * | 11/2014 | Lou | F16F 9/063 701/16 |
| 10,661,889 B2 * | 5/2020 | Plude | B64C 25/22 |
| 10,711,861 B1 * | 7/2020 | Kasprzak | F16F 9/063 |
| 12,286,218 B2 * | 4/2025 | Kim | B64C 25/34 |
| 12,365,451 B2 * | 7/2025 | Bennett | B64C 25/22 |
| 12,552,523 B2 * | 2/2026 | Flegny | B64C 25/60 |
| 2007/0164151 A1 * | 7/2007 | Luce | F16C 29/02 244/100 R |
| 2008/0111022 A1 * | 5/2008 | Lahargou | F16F 9/082 188/266.2 |

(Continued)

*Primary Examiner* — Medhat Badawi
(74) *Attorney, Agent, or Firm* — Christensen O'Connor Johnson Kindness PLLC

(57) ABSTRACT

The present disclosure includes features configured to reduce geometric stress concentration of landing gear shock absorber bearing seal grooves. The stress-reducing features are configured to provide a more gradual section area change as stresses approach a central seal groove axially from either side. The auxiliary stress-reduction grooves can have outwardly sloped surfaces for gradual section area change that increase in diameter approaching the central seal groove. As a result, the geometric stress concentration of the central seal groove can be significantly reduced within the corner radii of the rectangular groove by redirecting stress flow lines around the central seal groove, such as in axial loading and pressure loading from the central chamber during use of the shock-absorbing strut.

20 Claims, 4 Drawing Sheets

(56) References Cited

U.S. PATENT DOCUMENTS

2010/0219290 A1* 9/2010 Luce ........ B64C 25/22 244/102 SL
2012/0247892 A1* 10/2012 Cottet ........ B64C 25/22 188/297
2015/0041268 A1* 2/2015 Luce ........ F16F 9/3214 188/316
2015/0267723 A1* 9/2015 Kim ........ F16F 9/366 92/61
2016/0046366 A1* 2/2016 Martin ........ F16C 33/04 384/32
2016/0238100 A1* 8/2016 Smith ........ B64C 25/60
2016/0298714 A1* 10/2016 Schmidt ........ F16J 15/403
2017/0001716 A1* 1/2017 Mierzejewski ........ C23C 22/05
2017/0089418 A1* 3/2017 Kendrick ........ F16F 9/3264
2018/0001998 A1* 1/2018 Bennett ........ B64C 25/60
2018/0244373 A1* 8/2018 Mellor ........ B64C 25/20
2018/0312245 A1* 11/2018 Klim ........ B64C 25/60
2019/0211848 A1* 7/2019 Plude ........ F15B 11/072
2019/0226548 A1* 7/2019 Miwa ........ F16F 9/366
2019/0308720 A1* 10/2019 Antoni ........ B64C 25/60
2020/0354045 A1* 11/2020 Leong ........ B64C 25/001
2021/0024203 A1* 1/2021 Chappell ........ B64C 25/60
2022/0017212 A1* 1/2022 Bodki ........ F16F 9/342
2022/0341481 A1* 10/2022 Roessle ........ F16F 9/3242
2022/0388638 A1* 12/2022 Guidoux ........ B64C 25/60
2023/0038683 A1* 2/2023 Henrion ........ F16F 9/3292
2024/0140597 A1* 5/2024 Pasic ........ B64C 25/60
2024/0151292 A1* 5/2024 Kasprzak ........ F16F 9/537
2024/0158072 A1* 5/2024 Flegny ........ B64C 25/60
2024/0182162 A1* 6/2024 Bodki ........ F16F 9/342
2024/0182182 A1* 6/2024 M N ........ B64C 25/60
2024/0294251 A1* 9/2024 Fink ........ B64C 25/58
2024/0300639 A1* 9/2024 Bresciani ........ B64C 25/60
2024/0326992 A1* 10/2024 Bennett ........ B64C 25/20
2024/0336355 A1* 10/2024 Hatt ........ F16F 9/3221
2024/0343385 A1* 10/2024 Bodki ........ B64C 25/60
2024/0367780 A1* 11/2024 Lee ........ B64C 25/24
2024/0367783 A1* 11/2024 Madey ........ F16F 9/362
2024/0409207 A1* 12/2024 M N ........ B64C 25/60
2025/0002143 A1* 1/2025 Bodki ........ F16F 9/342
2025/0026471 A1* 1/2025 M N ........ B64C 25/60
2025/0100678 A1* 3/2025 Irwin ........ B64C 25/10
2025/0115352 A1* 4/2025 Kim ........ B64C 25/32
2025/0115353 A1* 4/2025 Tada ........ B64C 25/50
2025/0145281 A1* 5/2025 Lee ........ B64C 25/06
2025/0178719 A1* 6/2025 Hancock ........ B64C 25/34
2025/0229894 A1* 7/2025 Doux ........ B64C 25/12
2026/0042548 A1* 2/2026 Cretnik ........ B64C 25/32
2026/0097825 A1* 4/2026 Berruet ........ B62K 25/06

* cited by examiner

REDUCTION OF GEOMETRIC STRESS CONCENTRATION OF LANDING GEAR SHOCK ABSORBER BEARING SEAL GROOVES

FIELD OF DISCLOSURE

The present disclosure relates to reducing the geometric stress concentration of aircraft landing gear components. More particularly, the present disclosure relates to features configured to reduce geometric stress concentration of landing gear shock absorber bearing seal grooves.

BACKGROUND

Aircraft are typically equipped with landing gear systems that enable the aircraft to taxi, takeoff, and safely land on the ground. Some aircraft utilize landing gear that is retractable, i.e., the landing gear reciprocates between a deployed (extended) position and a stowed (retracted) position. While the vehicle is on the ground, the landing gear is deployed and supports the vehicle. The landing gear typically incorporates main fittings that permit vertical motion to cushion landing impacts or bump perturbations, dampen repeat oscillations, and minimize the tendency for an aircraft to rebound or "bounce." In this regard, main fittings commonly include oleo-pneumatic shock-absorbing struts ("oleo struts") that convert kinetic energy into heat by the use of a gas, providing elastic spring characteristics, and oil, providing dampening.

The shock-absorbing struts typically include at least upper and lower bearings that provide a bearing surface for an adjacent structural component, such as a piston reciprocating axially within a cylinder. The bearing can be a cylindrical component that includes at least one seal that contacts both adjacent structural components and maintains separation of fluids and gas, and retains pressure differential across the seal. The seal component can be positioned within rectangular retention grooves within the bearing and can be static, or permit dynamic motion between the bearing and the adjacent structural component. The rectangular grooves typically have relatively small corner radii that cause significant stress concentration as the strut is subjected to complex dynamic loading and pressures during use. The bearings can also include other complex geometric features such as shoulders, holes, local depressions, threads, etc. that can act as stress risers. Along with the bearing seal grooves, each of the stress risers dictate strut design choices, such as material selection and geometry, and significant stress can effectively reduce the service life of the shock-absorbing strut.

FIGS. 1A and 1B show a representative embodiment of a known landing gear assembly 10 for a vehicle, such as an aircraft, a maglev vehicle, or any other vehicle that utilizes a landing gear assembly. The landing gear assembly 10 includes a shock strut having a main fitting 20 and a piston 30 slidably received within the main fitting 20. The piston 30 is operably coupled to a wheel assembly that includes an axle 14 and a plurality of wheels 12 rotatably mounted thereto. Although not shown, the assembly 10 can include a torque link operably coupled to both the main fitting 20 and the axle 30 that prevents the wheel assembly from rotating relative to the main fitting 20 about a longitudinal axis of the piston 20. The assembly 10 has a foldable side brace 16 that is rotatably coupled to the main fitting 20 to stabilize the landing gear assembly 10 in a deployed position. When the aircraft is on the ground, the landing gear assembly 10 is in the deployed position, and the aircraft is at least partially supported by the wheels 12 of the landing gear assembly 10 and stabilized by the foldable side brace 16.

The piston 30 has a proximal end 32 disposed within the main fitting 20 and positioned above a bearing 31 having a surface configured to closely interface with and support the piston 30 during operation of the landing gear assembly 10. The proximal end 32 is typically the surface that interfaces with the gas or fluid within the shock-absorbing strut. The bearing 31 of the main fitting 20 can include a seal groove 22 configured to receive a seal 40 therein, which provides fluid, gas, and pressure differential separation between an internal chamber 34 of the landing gear assembly 10 and the atmosphere, such that fluid and/or gas does not travel between the bearing 31 and the piston 30 and out of the assembly 10. In the illustrated application, the seal 40 is dynamic, permitting sliding axial travel of the piston 30 with respect to the main fitting 20 while maintaining the seal therebetween. The seal groove 22 is shown as a rectangular circumferential groove extending from the internal surface of the bearing 31 outward, with relatively small internal corner radii representing stress risers.

SUMMARY

The present disclosure provides examples of stress-reducing bearing seal groove configuration for a landing gear shock absorber having a cylindrical bearing surface defining a central axis. In accordance with an aspect of the present disclosure, the bearing seal groove configuration can include: a central seal groove extending circumferentially around the bearing surface to a central groove radial depth with respect to the central axis and being configured to receive a seal member therein; a first auxiliary stress-reduction groove extending circumferentially around the bearing surface and positioned spaced axially apart from a first side of the central seal groove; and a second auxiliary stress-reduction groove extending circumferentially around the bearing surface and positioned spaced axially apart from a second side of the central seal groove opposite the first side. The first auxiliary stress-reduction groove can include a first sloped surface having a radial first depth with respect to the central axis that increases approaching the central seal groove, and a first end wall adjacent to the central seal groove and defining a first tooth therebetween. The second auxiliary stress-reduction groove can include a second sloped surface having a radial second depth with respect to the central axis that increases approaching the central seal groove, and a second end wall adjacent to the central seal groove and defining a second tooth therebetween. The first and second auxiliary stress-reduction grooves can be configured to redirect stress flow lines around the central seal groove during operation of the landing gear shock absorber.

The present disclosure provides examples of a bearing for a landing gear shock absorber having a main fitting defining a central axis, a piston axially movable within the main fitting, and a central chamber. In accordance with an aspect of the present disclosure, the bearing can include: a central seal groove extending circumferentially around the bearing to a central groove radial depth with respect to the central axis; a seal member positioned in the central seal groove and configured to abut the main fitting and the piston to seal the central chamber internally; a first auxiliary stress-reduction groove extending circumferentially around the bearing and positioned spaced axially apart from a first side of the central seal groove; and a second auxiliary stress-reduction groove extending circumferentially around the bearing and positioned spaced axially apart from a second side of the central seal groove opposite the first side. The first auxiliary stress-reduction groove can have a first sloped surface having a radial first depth with respect to the central axis that increases approaching the central seal groove, and a first end wall adjacent to the central seal groove and defining a first tooth therebetween. The second auxiliary stress-reduction groove can have a second sloped surface having a radial second depth with respect to the central axis that increases approaching the central seal groove, and a second end wall adjacent to the central seal groove and defining a second tooth therebetween. The first and second auxiliary stress-reduction grooves can be configured to redirect stress flow lines around the central seal groove during operation of the landing gear shock absorber.

In any embodiment, the central seal groove can have a rectangular profile including a first internal corner having a first radius and a second internal corner having a second radius.

In any embodiment, the first and second auxiliary stress-reduction grooves can be configured to redirect a portion of the stress flow lines to avoid the first radius and the second radius during operation of the landing gear shock absorber.

In any embodiment, the first auxiliary stress-reduction groove can further include a first transition having a first transition radius larger than the first radius of the central seal groove.

In any embodiment, the second auxiliary stress-reduction groove can further include a second transition having a second transition radius larger than the second radius of the central seal groove.

In any embodiment, the first auxiliary stress-reduction groove can have a first axial length, and wherein the radial first depth of the first auxiliary stress-reduction groove at the first end wall and the first axial length determine a slope of the first sloped surface.

In any embodiment, the second auxiliary stress-reduction groove can have a second axial length, and wherein the radial second depth of the second auxiliary stress-reduction groove at the second end wall and the second axial length determine a slope of the second sloped surface.

In any embodiment, the first and second auxiliary stress-reduction grooves can be mirror symmetrical about a plane extending through an axial center of the central seal groove.

In any embodiment, a ratio of a maximum of the radial first depth to the central groove radial depth can be from about 0.9 to about 1.1.

In any embodiment, a ratio of a maximum of the radial first depth to the central groove radial depth can be from about 1.05 to about 1.1.

In any embodiment, a ratio of a maximum of the radial second depth to the central groove radial depth can be from about 0.9 to about 1.1.

In any embodiment, a ratio of a maximum of the radial second depth to the central groove radial depth can be from about 1.05 to about 1.1.

In any embodiment, the first tooth has a first thickness in a direction along the central axis, and a ratio of the first thickness to the central groove radial depth can be from about 0.5 to about 0.75.

In any embodiment, the second tooth has a second thickness in a direction along the central axis, and a ratio of the second thickness to the central groove radial depth can be from about 0.5 to about 0.75.

In any embodiment, a ratio of the first axial length to an axial length of the central groove can be from about 1.0 to about 1.5.

In any embodiment, a ratio of the second axial length to an axial length of the central groove can be from about 1.0 to about 1.5.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

As will be described in more detail below, the present disclosure provides examples of features configured to reduce geometric stress concentration of landing gear shock absorber bearing seal grooves. In the current technology, stresses caused by known geometry of rectangular seal grooves can be mitigated by a limited range of options, including: (1) utilizing stronger materials capable of withstanding the elevated stress concentrations; (2) changing the corner radii of the rectangular seal groove to an elliptical shape, which poses significant difficulties in manufacturing; (3) increase the size of the component (e.g., increase the cylindrical wall thickness); and/or (4) increase the corner radii of the rectangular groove, which is incompatible with seal installation and with retention performance of the groove with respect to the seal. Embodiments of the present disclosure are expected to reduce stress concentration (stress risers) related to the seal groove by including auxiliary stress-reduction grooves spaced axially apart from a central seal groove, improving the structural integrity of the bearing portion of the shock-absorbing strut. The auxiliary stress-reduction grooves disclosed herein are configured to redirect stress flow lines around the central seal groove to reduce local stresses, such as the stresses at the corner radii stress risers of the central seal groove.

Figure 1A:
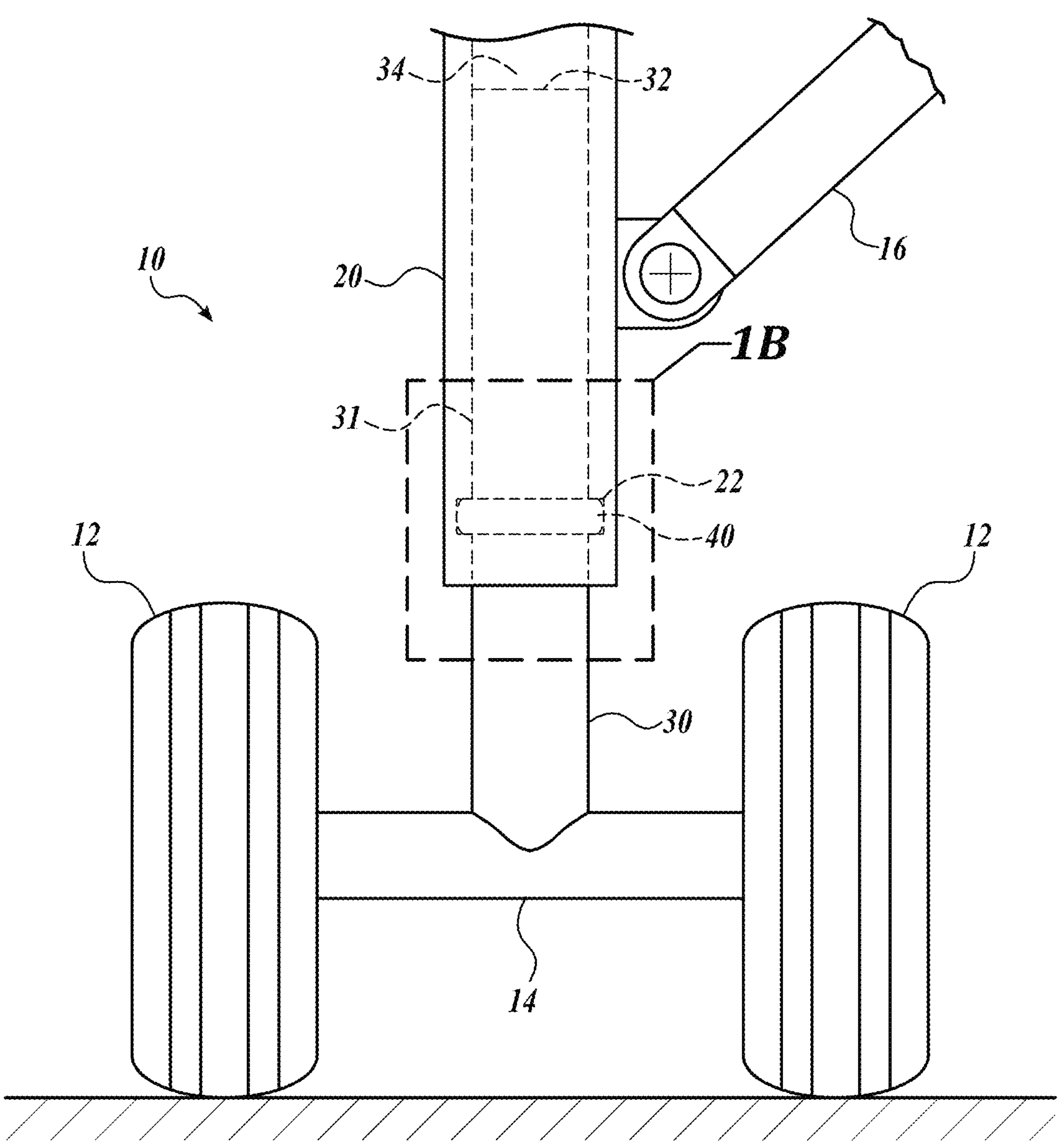
FIG. 1A depicts a simplified rear view of a known retractable dual-wheel landing gear assembly for a vehicle.
Figure 1B:
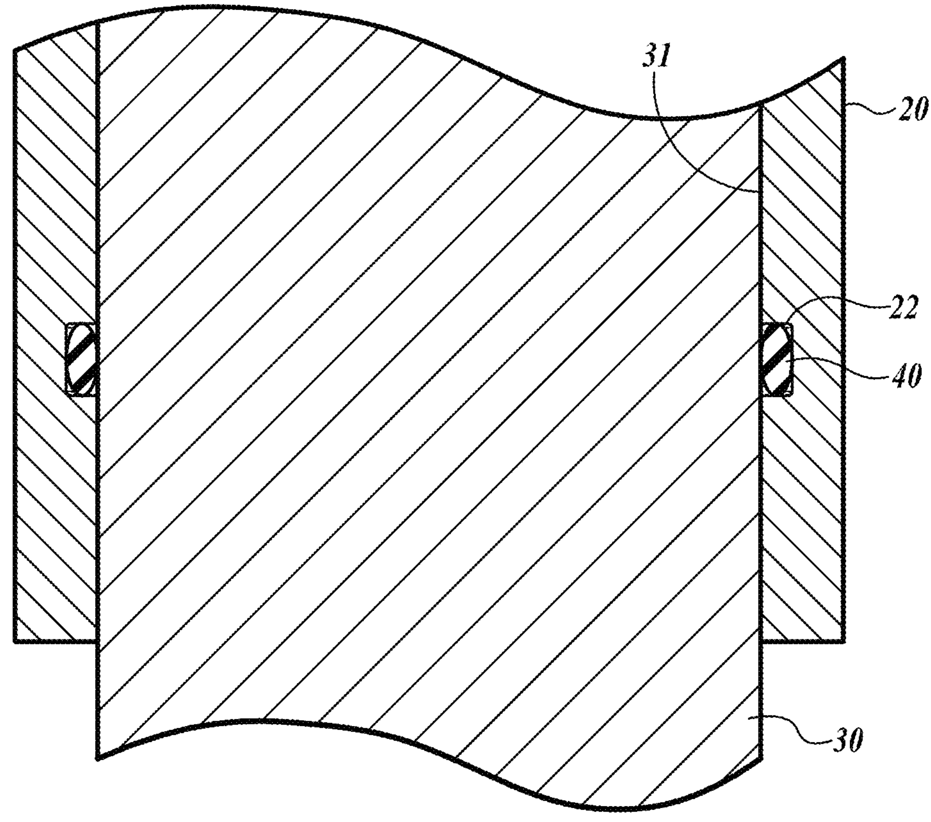
FIG. 1B depicts a detailed view of the known landing gear assembly of FIG. 1A, taken at the detail boundary shown in FIG. 1A.

As shown in view of the known landing gear assemblies of FIGS. 1A and 1B, the seal grooves 22 can have relatively small corner radii that cause significant stress concentrations within the seal groove 22. The embodiments of the present disclosure can be integrated into a landing gear assembly (e.g., the landing gear assembly 10) to reduce the geometric stress concentration in the area of the bearing seal groove when compared to current technology seal grooves, such as the seal groove 22 of FIGS. 1A and 1B. As such, the embodiments shown in FIGS. 2A and 2B can be adapted for use with the landing gear shown in FIG. 1A in a similar position to the detail view in FIG. 1B, and will be described in view of such an implementation and position in the following detailed description.

The auxiliary stress-reduction grooves of the present disclosure are configured to provide a more gradual section area change as stresses approach the central seal groove axially from either side, such as in axial loading and pressure loading from the internal chamber. The auxiliary stress-reduction grooves can provide the more gradual section area change by having an outwardly sloped surface that increase in diameter approaching the central seal groove. As a result, the geometric stress concentration of the central seal groove can be significantly reduced within the corner radii of the rectangular groove by redirecting stress flow lines around the central seal groove, such as in axial loading and pressure loading from the central chamber during use of the shock-absorbing strut. In some embodiments, by including the auxiliary stress-reduction grooves in conjunction with the central seal groove, the local Von-Mises stress in the corner radii of the rectangular central seal groove can be reduced on the order of 20%, or greater, and the major principal stress in the corner radii of the rectangular central seal groove can be reduced on the order of 30%, or greater. In other embodiments, the auxiliary stress-reduction grooves can provide any level of stress reduction within the central seal groove based on geometry of the auxiliary grooves and the redirection of the stress flow lines around the central seal groove.

Although embodiments of the present disclosure may be described with reference to a bearing seal geometry of main landing gear systems for aircraft, one skilled in the relevant art will appreciate that the disclosed embodiments are illustrative in nature and therefore should not be construed as limited to such an application. It should therefore be apparent that the disclosed technologies and methodologies have wide application, and therefore may be suitable for use with many types of suspension architectures for landing gear systems. Embodiments of the present disclosure can be used with any bearing seal configuration of the main fitting and piston of a shock-absorbing strut of a main landing gear, and can be employed as viable alternatives to increasing component size and/or material strength (e.g., cost and/or weight) of a landing gear, and/or can reduce stresses in the main fitting. For example, embodiments disclosed herein can be used with main landing gear systems having static and/or dynamic seals and any number of bearings. Accordingly, the following descriptions and illustrations herein should not limit the scope of the claimed subject matter.

Figure 2A:
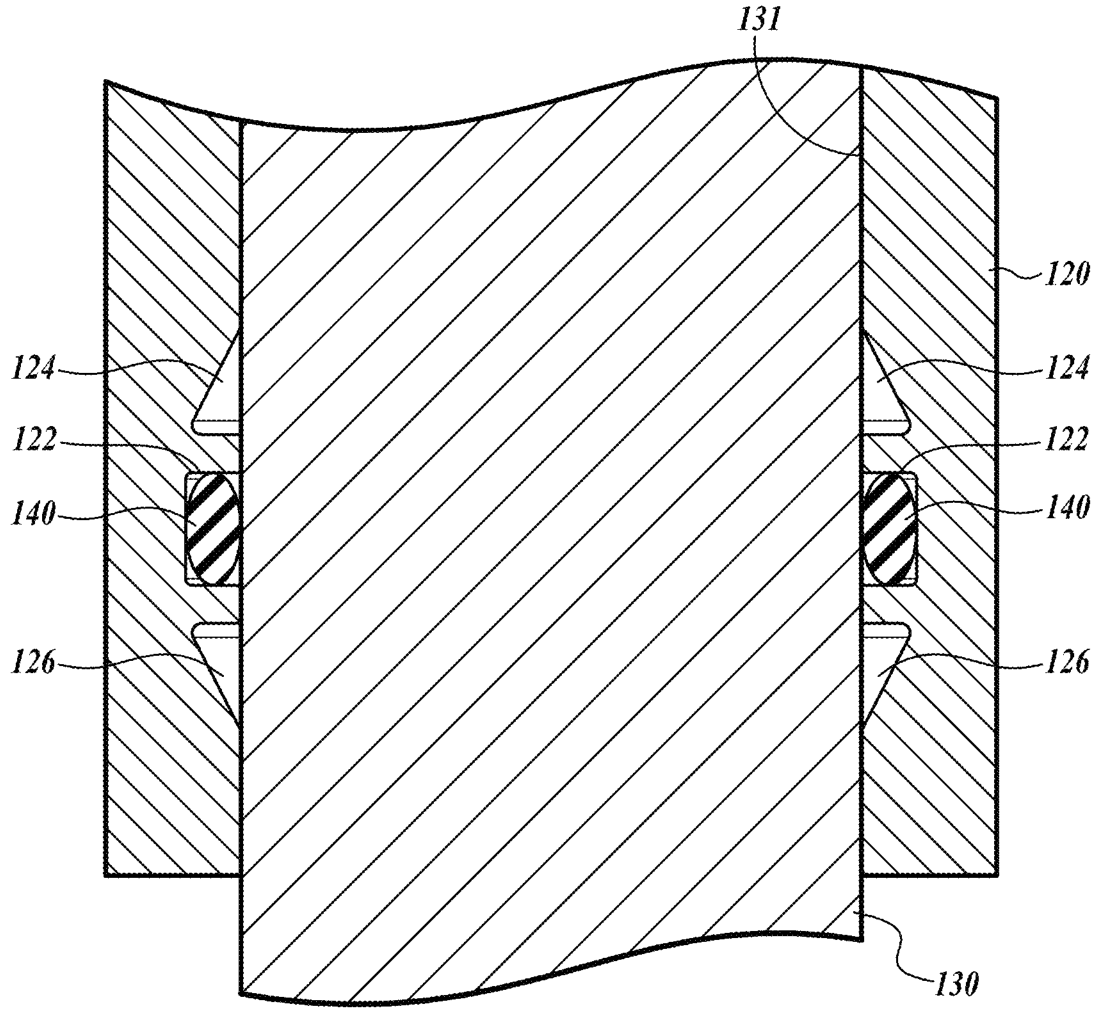
FIG. 2A depicts one example of a stress-reducing geometric configuration of bearing sealing grooves of a landing gear shock absorber in accordance with aspects of the present disclosure.
Figure 2B:
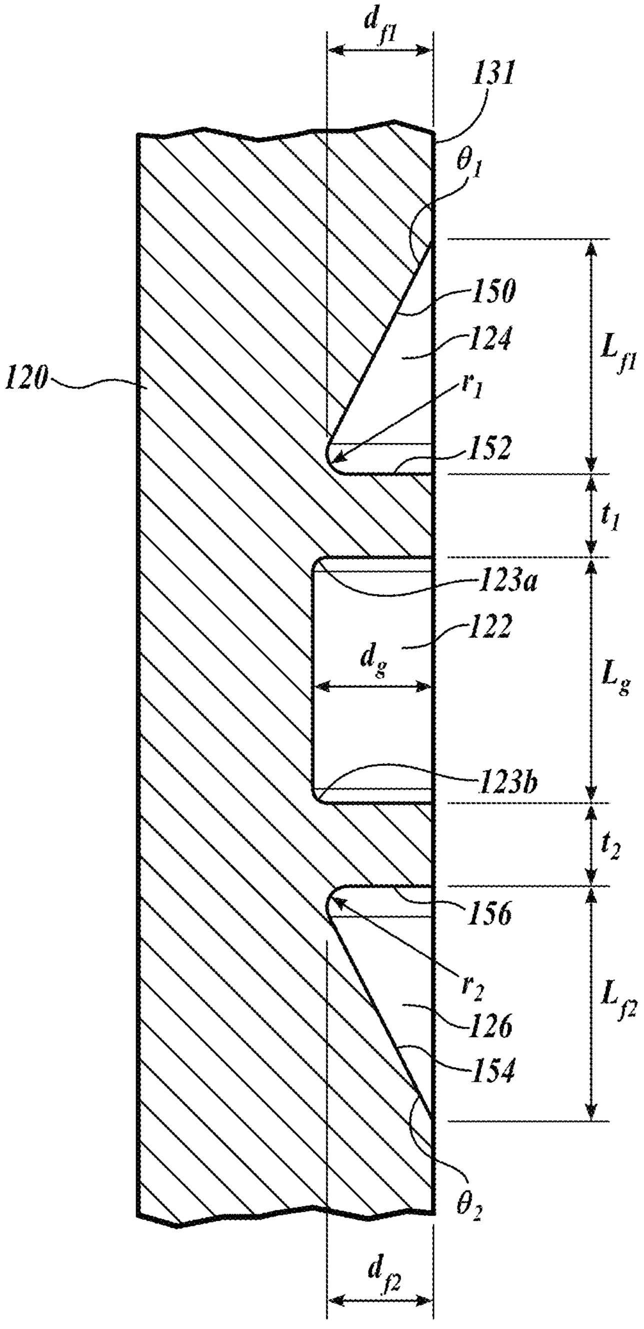
FIG. 2B depicts a detailed view of the bearing sealing grooves of FIG. 2A, showing one wall of a main fitting having the stress-reducing geometric configuration.

FIG. 2A depicts one example of a stress-reducing geometric configuration of bearing sealing grooves of a main fitting 120 of a landing gear shock absorber in accordance with aspects of the present disclosure. FIG. 2B depicts a detailed view of the bearing sealing grooves of FIG. 2A, simplified by showing one wall of the main fitting 120 having the stress-reducing geometric configuration. The bearing sealing grooves include a central seal groove 122 configured to receive and retain a seal 140 therein, a first auxiliary stress-reduction groove 124 positioned adjacent to the central seal groove 122 on a first side, and a second auxiliary stress-reduction groove 126 positioned adjacent to the central seal groove 122 on a second side of the central seal groove 122 opposite the first side, each of the grooves 122, 124, and 126 extending from a center-facing bearing surface 131 outward into a cylindrical wall of the main fitting 120. The auxiliary stress-reduction grooves 124 and 126 can be spaced axially apart from the central seal groove 122 on the respective first and second sides, such that the seal retaining geometry of the central seal groove 122 can be maintained while reducing the geometric stresses at the corner radii.

The bearing surface 131 can interface with an outer surface of a piston 130 that is configured to travel axially back and forth within the main fitting 120 to absorb landing impacts or bump perturbations, dampen repeat oscillations, and minimize the tendency for an aircraft to rebound or "bounce." The seal 140 can provide fluid, gas, and pressure differential separation between an internal chamber (such as the internal chamber 34 shown in FIG. 1A) of the landing gear assembly and the atmosphere, such that fluid and/or gas does not travel between the bearing surface 131 and the piston 130 during operation of the landing gear assembly. In this regard, the seal 140 is considered dynamic, permitting sliding axial travel of the piston 130 with respect to the main fitting 120 while maintaining the seal therebetween.

As shown most clearly in FIG. 2B, the central seal groove 122 is shown as a rectangular circumferential groove extending from the internal surface of the bearing 131 outward, with relatively small corner radii at a first internal corner 123*a* and a second internal corner 123*b*. The central seal groove 122 can have a central groove depth $d_g$ extending into the wall of the main fitting 120 from the bearing surface 131, and a groove length $L_g$. The depth $d_g$ and groove length $L_g$ can be adapted for different seal types, multi-component seals, and/or geometry of the main fitting 120. In the illustrated embodiment, the seal 140 is an annular seal shown in a compressed state (elliptical/oval). In other embodiments, the seal 140 can be rectangular in cross section, annular, or any other suitable shape, and the shape of the seal 140 can dictate the dept $d_g$ and length $L_g$ of the central seal groove 122. Additionally, the radii of the first and second internal corners 123*a* and 123*b* can be larger or smaller than those shown in the FIGURES in proportion to the size of the central seal groove 122, depending on the specified seal type, the material and size of the main fitting, and/or the manufacturing method.

The first auxiliary stress-reduction groove 124 can include a first sloped surface 150 with increasing depth radially from a central axis of the main fitting 120 as the first sloped surface 150 approaches the central seal groove 122 axially. For example, the first sloped surface 150 can have a radial position from the central axis matching the bearing surface 131 at a position farthest axially away from the central seal groove 122, and gradually increase in radial position. The first sloped surface 150 can slope at a first angle $\theta_1$ with respect to the bearing surface 131 toward a first end wall 152 adjacent to the central seal groove 122. As shown, the transition between the first sloped surface 150 and the first end wall 152 can have a first radius $r_1$ configured to reduce stress concentration at the transition, redirecting stress around the first and second internal corners 123*a* and 123*b*. In this regard, the first radius $r_1$ can be larger than the radius of the first internal corner 123*a*. The first auxiliary stress-reduction groove 124 can have a first length $L_{f1}$ and a first depth $d_{f1}$ that define the geometry of the first auxiliary stress-reduction groove 124. The first angle $\theta_1$ can be dictated by the dimensions of the first length $L_{f1}$ and a first depth $d_{f1}$. Although a flat first sloped surface 150 is shown, the first sloped surface can be a curved surface or have compound flat sections, depending on application. The first auxiliary stress-reduction groove 124 can be positioned axially away from the central seal groove 122 leaving a portion (a first "tooth") of the main fitting 120 therebetween, having a thickness $t_1$.

The second auxiliary stress-reduction groove 126 can include a second sloped surface 154 with increasing depth radially from the central axis of the main fitting 120 as the second sloped surface 154 approaches the central seal groove 122 axially. For example, the second sloped surface 154 can have a radial position from the central axis matching the bearing surface 131 at a position farthest axially away from the central seal groove 122, and gradually increase in radial position. The second sloped surface 154 can slope at a second angle $\theta_2$ with respect to the bearing surface 131 toward a second end wall 156 adjacent to the central seal groove 122. The second angle As shown, the transition between the second sloped surface 154 and the second end wall 156 can have a second radius $r_2$ configured to reduce stress concentration at the transition, redirecting stress around the first and second internal corners 123*a* and 123*b*. In this regard, the second radius 12 can be larger than the radius of the second internal corner 123*b*. The second auxiliary stress-reduction groove 126 can have a second length $L_{f2}$ and a second depth $d_{f2}$ that define the geometry of the second auxiliary stress-reduction groove 126. The second angle $\theta_2$ can be dictated by the dimensions of the second length $L_{f2}$ and a second depth $d_{f2}$. Although a flat second sloped surface 154 is shown, the second sloped surface can be a curved surface or have compound flat sections, depending on application. The second auxiliary stress-reduction groove 126 can be positioned axially away from the central seal groove 122 leaving a portion (a second "tooth") of the main fitting 120 therebetween, having a second thickness $t_2$.

Although the second auxiliary stress-reduction groove 126 is shown as mirror symmetrical to the first auxiliary stress-reduction groove 124 across an axially central plane of the central seal groove 122, the first and second auxiliary stress-reduction grooves 124 and 126 can have differing geometry, including different depths, lengths, and slope angles. As such, the auxiliary stress-reduction grooves can be specified depending on the geometric stresses of the component.

In some embodiments, the ratio of the first and/or second depths $d_{f1}$ and/or $d_{f2}$ to the depth $d_g$ can be from about 0.9 to about 1.1, and can be about 1.05. In this regard, the depth of the first and second auxiliary stress-reduction grooves 124 and 126 can be similar in depth to the central seal groove 122.

In some embodiments, the ratio of the first and/or second thicknesses $t_1$ and/or $t_2$ to the depth $d_g$ can be from about 0.5 to about 0.75 to provide adequate bearing support in the portion of the main fitting 120 between each of the first and second auxiliary stress-reduction grooves 124 and 126 and the central seal groove 122. In this regard, the ratio $t_{1/2}/d_g$ range of about 0.5 to about 0.75 meets minimum length requirements for liner application and provides sufficient shear strength at the root of the tooth to resist the shear force due to friction. If the thicknesses $t_1$ or $t_2$ are too large, stress flow lines from the first and second auxiliary stress-reduction grooves 124 and 126 will deviate from straight lines toward the first and second internal corners 123*a* and 123*b* and bend inwards, therefore reducing the efficiency of the stress-reducing geometry.

In some embodiments, the ratio of the first and/or second lengths $L_{f1}$ and/or $L_{f2}$ to the length $L_g$ can be from about 1 to about 1.5. In this regard, a greater ratio in the range is expected to provide smoother stress flow with respect to the first and second internal corners 123*a* and 123*b*, but will reduce the bearing area of the main fitting 120 with respect to the piston 130.

In an example embodiment, the ratio $d_{f/21}/d_g$ can be about 1.05, the ratio $t_{1/2}/d_g$ can be about 0.5, and the ratio $L_{f1/2}/L_g$ can be about 1.0.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B." Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A stress-reducing bearing seal groove configuration for a landing gear shock absorber having a cylindrical bearing surface defining a central axis, the bearing seal groove configuration comprising: a central seal groove extending circumferentially around the bearing surface to a central groove radial depth with respect to the central axis and configured to receive a seal member; a first auxiliary stress-reduction groove extending circumferentially around the bearing surface and positioned spaced axially apart from a first side of the central seal groove, the first auxiliary stress-reduction groove having: a first sloped surface having a radial first depth with respect to the central axis that increases approaching the central seal groove; and a first end wall adjacent to the central seal groove and defining a first tooth between the first end wall and the central seal groove; and a second auxiliary stress-reduction groove extending circumferentially around the bearing surface and positioned spaced axially apart from a second side of the central seal groove opposite the first side, the second auxiliary stress-reduction groove having: a second sloped surface having a radial second depth with respect to the central axis that increases approaching the central seal groove; and a second end wall adjacent to the central seal groove and defining a second tooth between the second end wall and the central seal groove, wherein the first and second auxiliary stress-reduction grooves are configured to redirect stress flow lines around the central seal groove during operation of the landing gear shock absorber.

2. The bearing seal groove configuration of claim 1, wherein the central seal groove has a rectangular profile including a first internal corner having a first radius and a second internal corner having a second radius.

3. The bearing seal groove configuration of claim 1, wherein the first and second auxiliary stress-reduction grooves are configured to redirect a portion of the stress flow lines to avoid the first radius and the second radius during operation of the landing gear shock absorber.

4. The bearing seal groove configuration of claim 3, wherein the first auxiliary stress-reduction groove further comprises a first transition having a first transition radius larger than the first radius of the central seal groove.

5. The bearing seal groove configuration of claim 4, wherein the second auxiliary stress-reduction groove further comprises a second transition having a second transition radius larger than the second radius of the central seal groove.

6. The bearing seal groove configuration of claim 1, wherein the first auxiliary stress-reduction groove has a first axial length, and wherein the radial first depth of the first auxiliary stress-reduction groove at the first end wall and the first axial length determine a slope of the first sloped surface.

7. The bearing seal groove configuration of claim 6, wherein the second auxiliary stress-reduction groove has a second axial length, and wherein the radial second depth of the second auxiliary stress-reduction groove at the second end wall and the second axial length determine a slope of the second sloped surface.

8. The bearing seal groove configuration of claim 1, wherein the first and second auxiliary stress-reduction grooves are mirror symmetrical about a plane extending through an axial center of the central seal groove.

9. The bearing seal groove configuration of claim 1, wherein a ratio of a maximum of the radial first depth to the central groove radial depth is from about 0.9 to about 1.1.

10. The bearing seal groove configuration of claim 1, wherein a ratio of a maximum of the radial first depth to the central groove radial depth is from about 1.05 to about 1.1.

11. The bearing seal groove configuration of claim 1, wherein a ratio of a maximum of the radial second depth to the central groove radial depth is from about 0.9 to about 1.1.

12. The bearing seal groove configuration of claim 1, wherein a ratio of a maximum of the radial second depth to the central groove radial depth is from about 1.05 to about 1.1.

13. The bearing seal groove configuration of claim 1, wherein the first tooth has a first thickness in a direction along the central axis, and wherein a ratio of the first thickness to the central groove radial depth is from about 0.5 to about 0.75.

14. The bearing seal groove configuration of claim 13, wherein the second tooth has a second thickness in a direction along the central axis, and wherein a ratio of the second thickness to the central groove radial depth is from about 0.5 to about 0.75.

15. The bearing seal groove configuration of claim 6, wherein a ratio of the first axial length to an axial length of the central groove is from about 1.0 to about 1.5.

16. The bearing seal groove configuration of claim 7, wherein a ratio of the second axial length to an axial length of the central groove is from about 1.0 to about 1.5.

17. A bearing for a landing gear shock absorber having a main fitting defining a central axis, a piston axially movable within the main fitting, and a central chamber, the bearing comprising: a central seal groove extending circumferentially around the bearing to a central groove radial depth with respect to the central axis; a seal member positioned in the central seal groove and configured to abut the main fitting and the piston to seal the central chamber internally; a first auxiliary stress-reduction groove extending circumferentially around the bearing and positioned spaced axially apart from a first side of the central seal groove, the first auxiliary stress-reduction groove having: a first sloped surface having a radial first depth with respect to the central axis that increases approaching the central seal groove; and a first end wall adjacent to the central seal groove and defining a first tooth between the first end wall and the central seal groove; and a second auxiliary stress-reduction groove extending circumferentially around the bearing and positioned spaced axially apart from a second side of the central seal groove opposite the first side, the second auxiliary stress-reduction groove having: a second sloped surface having a radial second depth with respect to the central axis that increases approaching the central seal groove; and a second end wall adjacent to the central seal groove and defining a second tooth between the second end wall and the central seal groove, wherein the first and second auxiliary stress-reduction grooves are configured to redirect stress flow lines around the central seal groove during operation of the landing gear shock absorber.

18. The bearing of claim 17, wherein the central seal groove has a rectangular profile including a first internal corner having a first radius and a second internal corner having a second radius, and wherein the seal is configured to be received within the rectangular profile.

19. The bearing of claim 18, wherein the first and second auxiliary stress-reduction grooves are configured to redirect a portion of the stress flow lines to avoid the first radius and the second radius during operation of the landing gear shock absorber.

20. The bearing of claim 19, wherein the first auxiliary stress-reduction groove further comprises a first transition having a first transition radius larger than the first radius of the central seal groove, and wherein the second auxiliary stress-reduction groove further comprises a second transition having a second transition radius larger than the second radius of the central seal groove.

* * * * *